US012639666B2

(12) United States Patent
Ramseier et al.

(10) Patent No.: US 12,639,666 B2
(45) Date of Patent: May 26, 2026

(54) ORDER PICKING SYSTEM

(71) Applicant: FERAG AG, Hinwil (CH)

(72) Inventors: Marcel Ramseier, Hinwil (CH); Simon Guhl, Hinwil (CH); Roberto Fenile, Hinwil (CH)

(73) Assignee: FERAG AG, Hinwil (CH)

( * ) Notice: Subject to any disclaimer, the term of this patent is extended or adjusted under 35 U.S.C. 154(b) by 101 days.

(21) Appl. No.: 18/601,579

(22) Filed: Mar. 11, 2024

(65) Prior Publication Data

US 2024/0311753 A1 Sep. 19, 2024

(30) Foreign Application Priority Data

Jul. 13, 2023 (CH) .................................... 753/2023

(51) Int. Cl.
 *G06Q 10/087* (2023.01)
 *B65G 15/22* (2006.01)

(52) U.S. Cl.
 CPC ........... *G06Q 10/087* (2013.01); *B65G 15/22* (2013.01)

(58) Field of Classification Search
 CPC ...... G06Q 10/087; B65G 15/22; B65G 13/10; B65G 39/02; B65G 47/22; B65G 1/1378; B65G 47/61; B65G 57/06; B65G 57/10; B65G 1/1376
 USPC ......................................................... 705/28
 See application file for complete search history.

(56) References Cited

U.S. PATENT DOCUMENTS 5,022,218 A 6/1991 Prakken
2005/0139454 A1 6/2005 Ohno et al.

2018/0244473 A1 * 8/2018 Mathi .................. B65G 47/905
2023/0114128 A1 4/2023 Bretz et al.
2023/0185663 A1 6/2023 Wang et al.
2023/0211952 A1 * 7/2023 Liu ...................... B65G 1/1373
  700/216
2023/0219249 A1 * 7/2023 Schäfer .................... B26D 7/28
  83/29

FOREIGN PATENT DOCUMENTS

| CH | 719 043 A1 | 4/2023 | |
|---|---|---|---|
| CN | 113423654 A | * 9/2021 | ............. B65G 1/065 |
| DE | 103 46 122 A1 | 4/2005 | |
| DE | 60 2004 009 749 T2 | 10/2008 | |

(Continued)

OTHER PUBLICATIONS

Swiss Federal Institute of Intellectual Property (IGE/IPI) Bern, CH, "Communication and Search Report," for related Swiss Patent Application CH01337/23, Mar. 27, 2024, 3pp.

(Continued)

*Primary Examiner* — Russell S Glass

(74) *Attorney, Agent, or Firm* — Pauley Erickson & Swanson

(57) ABSTRACT

An order picking system (1) for transporting and providing general cargo (S, S') and associated method includes a feeding device (2) with a suspension conveyor (21) for feeding the general cargo (S, S'), and a delivery station (22) for delivering the general cargo (S, S') from the suspension conveyor (2.1) to a transfer device (3) for grouping the conveyed general cargo (S, S'), which transfer device (3) includes a horizontally movable transfer element (31) by which the general cargo (S, S') can be grouped gravity-driven onto a grouping space (P).

24 Claims, 5 Drawing Sheets

(56)                References Cited

FOREIGN PATENT DOCUMENTS

| DE | 102018221043 A1 * | 6/2020 | .......... B65G 1/1376 |
|----|----|----|----|
| EP | 1 309 504 B1 | 4/2006 | |
| EP | 3 357 839 A1 | 8/2018 | |
| EP | 3 733 567 A1 | 11/2020 | |
| EP | 4 163 235 A1 | 4/2023 | |
| JP | H03182417 A | 8/1991 | |
| JP | 9-77261 A | 3/1997 | |
| WO | WO 2010/12511 A1 | 11/2010 | |
| WO | WO 2020/140133 A2 | 7/2020 | |
| WO | WO 2021/011978 A1 | 1/2021 | |
| WO | WO 2024/000005 A1 | 1/2024 | |

OTHER PUBLICATIONS

EPO (Munchen, DE), Form No. 1507N, Communication and Form No. 1503 03.82, Ext. European Search Report for European Patent Appln. No. EP 24161808.1, dated Jul. 25, 2024 (10pp).

EPO (Munchen, DE), English machine translation of Form No. 1507N, Communication and No. 1503 03.82, Ext. EP Search Report for European Patent Appln. No. EP 24161808.1, dated Jul. 25, 2024 (11 pp.).

* cited by examiner

ORDER PICKING SYSTEM

CROSS-REFERENCE TO RELATED APPLICATIONS

Swiss Patent Application Nos. CH 000285/2023, filed 13 Mar. 2023; CH 000578/2023, filed 31 May 2023; CH 000753/2023, filed 13 Jul. 2023 and Swiss Patent Application No. CH 001337/2023, filed 30 Nov. 2023, the priority documents, corresponding to this invention, to which a foreign priority benefit is claimed under Title 35, United States Code, Section 119, and their entire teachings are incorporated, by reference, into this specification.

FIELD OF THE DISCLOSURE

The present disclosure relates to an order picking system with a transfer device, which comprises a horizontally movable transfer element, as well as a method for transporting and providing general cargo by means of the order picking system.

BACKGROUND OF THE DISCLOSURE

DE 10346122 A1 was published on Apr. 21, 2005 on behalf of Beumer Maschinenfabrik GmbH & Co. KG and discloses a device for transferring parts of piece goods to a sorter, with an infeed conveyor from which the parts of piece goods are preferably conveyed in a predetermined orientation and at its discharge end are to be transferred individually in a controlled manner to a transfer station of a transfer conveyor arranged directly downstream of the infeed conveyor, from which one part of piece goods is to be transferred in a controlled manner to a receiving station of the sorter arranged downstream of the transfer conveyor. An intermediate conveyor with a support plate arranged above the conveying level of the transfer conveyor and reversibly drivable in the conveying direction of the infeed conveyor for the retainer of the piece goods is used to transfer the piece goods to the transfer conveyor.

CH 719043 A1 was published on 14 Apr. 2023 on behalf of the applicant and discloses a transfer device for transferring conveyed goods, such as flat goods, from an infeed conveyor to conveyor stations of a path conveyor. The transfer device forms a stationary receiving space for at least one conveyed item, which is bounded at the bottom by a movable support member. The support member can be moved by means of a movement device between a support position, in which the at least one conveyed item lies flat on the support member, and a delivery position, in which the conveyed item falls downwards by means of gravity through a freely given transfer opening onto a conveying station of the path conveyor that is moved past below the receiving space.

SUMMARY OF THE DISCLOSURE

While there are fewer orders in the business-to-business (B2B) area but with large volumes and the same product sequences, as companies typically request products in large quantities, there are typically many individual orders in the business-to-customer (B2C) area with individual deliveries of goods or small volumes and small quantities, which can also show high seasonal fluctuations. General cargo can include a very wide range of different products. For example, both inherently stable products, such as parcels, boxes or books, as well as flexible and essentially flat general cargo, such as magazines or even individual loose items of clothing packed only with a flexible protective cover have to be picked at the same time.

For order picking of general cargo, but especially for business-to-customer (B2C) order picking, it is important to be able to process and pick different types of goods in the same system. Furthermore, the individual orders should also be compiled in the same system and these picked orders should also be provided packed ready for dispatch directly at the exit of the system. In known systems, the delivered goods are delivered in trays or similar transport containers and then usually packed manually in cardboard boxes of a suitable size. This step is therefore very labor-intensive.

One objective of the disclosure can be seen in providing an order picking system that enables more efficient preparation of grouped goods for packaging with a wide variety of product categories.

An order picking system according to the disclosure for transporting and providing general cargo usually comprises at least one feeding device. The feeding device comprises a suspension conveyor for feeding the general cargo and a delivery station for delivering the general cargo from the suspension conveyor to a transfer device for grouping the fed general cargo. The transfer device typically comprises a horizontally movable transfer element, by means of which the general cargo can be gravity-driven grouped to a grouping space. In the context of the present disclosure, horizontal is not to be understood in the geometric sense as exactly vertical to the vertical, but also includes an inclination of $\pm 10°$.

The transfer element can be used solely for transferring the general cargo to a downstream device. Typically, the grouping space is arranged on a conveyor. Alternatively, or in addition, however, the transfer element can also be controlled in such a way that general cargo conveyed one after the other can be stacked on a grouping space or can be transferred to a common grouping space offset to one another and/or at least partially overlapping with one another.

An alternative order picking system according to the disclosure for transporting and providing general cargo can also be provided. This can also comprise a feeding device comprising a suspension conveyor for feeding the general cargo and a delivery station for delivering the general cargo from the suspension conveyor to a transfer device. The transfer device can have a feeding conveyor for grouping the general cargo delivered from the delivery station, by means of which the general cargo can be grouped at a grouping space by gravity. The general cargo can be received from the delivery station by the conveyor and conveyed to a grouping space. This grouping space can be arranged on a delivery conveyor, whereby the general cargo is transferred from the feeding conveyor to the delivery conveyor by gravity. In this case, the general cargo can be transferred unaligned from the feeding conveyor to the grouping space in form of a heap.

The alternative embodiment of the order picking system is an independent concept and the applicant reserves the right to pursue this and the other technically compatible features of the disclosure in the form of a divisional application.

The general cargo is delivered to the transfer device by means of the suspension conveyor. The suspension conveyor of the feeding device typically comprises suspension conveyor receiving means in the form of pouches, baskets, bags or carrying loops, by means of which the general cargo can be conveyed in a suspended state. The suspension conveyor receiving means in the form of pouches, baskets, bags or carrying loops for discharging the general cargo from the suspension conveyor can be emptied, in particular emptied by pivoting the suspension conveyor receiving means.

To convey the suspension conveyor receiving means, the suspension conveyor typically comprises at least one rail on which the suspension conveyor receiving means can be conveyed in a suspended state by means of carriages. The suspension conveyor receiving means can typically be emptied via an opening at the top or via an opening in the side. For this purpose, they can be swiveled backwards to empty the general cargo stored in them via the opening at the top or swiveled to the side to empty the general cargo held in them via the opening in the side.

The suspension conveyor receiving means can be designed in the form of suspension conveyor pouches with a rear wall and a front wall, which are flexibly connected to each other at least via a base section in such a way that they can be moved back and forth between a first state, in which they form an open and fillable pouch, and a second state, in which they lie close together and form a folded pouch.

The suspension conveyor typically connects directly to the delivery station, which usually includes an emptying device. The suspension conveyor or several suspension conveyors can connect the transfer device with upstream devices. The suspension conveyor can thus be used to connect the delivery of the goods with the dispatch of the goods within a logistics system, which allows the flow of goods to be established.

The emptying device can comprise a circulating conveyor belt for taking over general cargo transported in the suspension conveyor receiving means. At a contact section, the conveying path of the suspension conveyor and the conveying path of the conveyor belt can be arranged relative to one another in such a way that the distance between the conveying path of the suspension conveyor and the conveying path of the conveyor belt becomes continuously smaller, so that when a suspension conveyor receiving means is conveyed along the contact section, a front side of the suspension conveyor receiving means contacts the conveyor belt and comes to rest on it and the suspension conveyor receiving means are pivoted to the rear or alternatively to the side.

In a transfer section, the conveying path of the suspension conveyor receiving means and the conveying path of the conveyor belt can run essentially parallel to one another with a certain downward slope, with the front of the respective suspension conveyor receiving means continuing to lie on the conveyor belt during conveying along the transfer section, so that the opening of the suspension conveyor receiving means is oriented obliquely downwards and the general cargo present in the suspension conveyor receiving means can be transferred from the suspension conveyor receiving means, preferably gravity-driven, onto the conveyor belt.

In a separating section, the distance between the conveying path of the suspension conveyor and the conveying path of the conveyor belt can become continuously greater, so that when a suspension conveyor receiving means is conveyed along the separating section, the emptied suspension conveyor receiving means is lifted off the conveyor belt and swings back into the free-hanging position. The conveying speeds of the conveyor belt and the suspension conveyor are usually the same.

The conveyor belt may have a plurality of outwardly directed transverse ribs evenly spaced along a circumference of the conveyor belt. The relative position of the ribs and the suspension conveyor receiving means is typically selected such that in the contact section, a rib catches up with the suspension conveyor receiving means, contacts the bottom section of the suspension conveyor receiving means and pushes it forward in the conveying direction until the suspension conveyor receiving means has transitioned to an emptying state. In the contact section, in the area in which the respective rib touches the floor section of the suspension conveyor receiving means, the suspension conveyor and the conveyor belt can be operated at the same speed. In particular, the suspension conveyor and the conveyor belt can run constantly at the same speed.

The spacing of the ribs can be selected so that during the conveying of a suspension conveyor receiving means along the transfer section, a general cargo present in the suspension conveyor receiving means slides gravity-driven out of the pouch onto the conveyor belt and continues to slide downwards on the conveyor belt assisted by gravity until it is caught and held by the rib running ahead of the suspension conveyor receiving means. The ribs of the conveyor belt can also consist of a large number of parallel fingers.

An upper end of the slide can have slots whose position corresponds to the fingers of the ribs of the conveyor belt, so that when the conveyor belt is deflected, the fingers of the ribs and the slots of the slide interact with each other in a meshing manner. The general cargo held back behind a rib can then be released in a timed manner and then conveyed further on the slide by gravity. Another conveyor can take over the released general cargo from the slide.

The general cargo delivered from the suspension conveyor to the delivery station is conveyed to the transfer device by means of the feeding device. The transfer device can have a feeding conveyor adjacent to the delivery station for this purpose. The feeding conveyor can for example be designed as a belt or roller conveyor. The feeding conveyor can be used to convey the general cargo typically delivered to the delivery station from the suspension conveyor receiving means of the suspension conveyor to the transfer element. Particularly when emptying and feeding by means of a slide, the general cargo typically does not arrive at the transfer device in a precisely synchronized and evenly spaced manner.

For this purpose, the feeding conveyor can be operated in stop-and-go mode in order to be able to transfer the respective general cargo to the transfer element at precise intervals. The transfer element can typically be movable, in particular horizontally movable, at least between a receiving position for receiving a conveyed general cargo and at least one delivery position for delivering a general cargo located on the transfer element.

Alternatively, or additionally, the feeding conveyor can be accelerated or decelerated so that the general cargo conveyed by the feeding device can already be transferred to the transfer element in the receiving position in a synchronized manner so that it can also be transferred from the transfer element to a downstream delivery conveyor in the delivery position in a synchronized manner. This may be particularly necessary if the delivery conveyor is designed as a tray conveyor with separate trays, for example. In this case, general cargo must be transferred essentially centrally to the respective tray in order to prevent the general cargo from falling out or jamming between two consecutive trays.

In addition to synchronized feeding conveyors, it may be necessary not only to space the general cargo along a conveying direction and align it synchronously, but also to align it parallel to the conveying direction or to transfer it centrally to the transfer element. For this purpose, the transfer device can comprise an alignment module, which includes driven alignment elements by means of which the general cargo can be aligned along and/or laterally with respect to a conveying direction. Since the general cargo is not transferred in an aligned manner, particularly in the case of feeding devices that comprise a slide for forwarding the general cargo from the delivery station to the feeding conveyor or the transfer element, the alignment module can preferably be arranged upstream of the feeding conveyor in order to bring the alignment to a target alignment.

The alignment elements can have the form of rollers, wheels or balls. Balls offer greater maneuverability and flexibility in a conveyor system application compared to rollers or omnidirectional wheels. They can rotate freely in all directions, allowing for almost frictionless travel through tight corners and around obstacles such as other general cargo. In addition, balls can distribute weight more evenly than rollers or wheels, resulting in less wear and tear on the conveyor system. This in turn can lead to a longer conveyor system life and lower maintenance costs.

As a rule, each alignment module comprises a plurality of alignment elements. These can be driven individually and independently of each other in order to align a general cargo along the conveying direction and/or laterally to it during conveying on the alignment module. In order to convert a random alignment of a conveyed general cargo into a target alignment, a sensor unit can be arranged above the alignment module, by means of which an alignment of the general cargo on the alignment module can be detected.

Based on a sensor signal measured by the sensor unit and sent to a control unit, the control unit can be used to align the general cargo by actively and directionally driving the alignment elements on the alignment module and/or distance it from an upstream or downstream item of general cargo. The general cargo is then preferably aligned and spaced out before being transferred to the feeding conveyor, which then transfers it to the transfer element in synchronization with the cycle.

The transfer element can be designed and accelerated so that the general cargo on it can be transferred to the grouping space essentially motionless and gravity-driven due to its inertia in the horizontal plane. Through an accelerated, typically abrupt movement, the transfer element can be removed from under the general cargo lying on it. Due to its mass and the resulting inertia, the general cargo temporarily remains almost unchanged during the abrupt movement before it falls down due to gravity.

The horizontally movable transfer element of the transfer device can, for example, be at least partially plate-shaped or designed as a plate, which is optionally movably mounted in lateral guides or designed as a rotatable plate, which is rotatably mounted for transferring the general cargo, preferably below the conveyor. The plate can be designed as an inherently stable plate or as an unstable and guided plate. The plate typically comprises a coefficient of friction that allows the general cargo to slide on the plate due to its inertia when the plate is abruptly accelerated.

Good results can be achieved if the plate is at least partially made of a plastic or at least partially coated with a plastic with good sliding properties. A coefficient of static friction us between the general cargo and the transfer element is, for example, less than or equal to 0.5, preferably less than or equal to 0.25. Typical materials for this can be phenolic or epoxy resin-based hard cotton fabrics. Alternatively, polyamide (PA), polyterafluoroethylene (PTFE), polyterafluoroethylene (PE) or polyester terephtalate (PET) can also be used.

Alternatively, the horizontally movable transfer element of the transfer device can also be designed as a belt conveyor with a movable belt section, preferably in the form of a telescopic conveyor belt. To discharge the respective general cargo, the movable belt section can be accelerated in such a way that it is retracted underneath the general cargo due to its inertia and the general cargo can thus be transferred by gravity.

In addition, to simply moving back and forth between the receiving and delivery position, the transfer element can also be moved incrementally. This makes it possible to control the receiving position and the delivery position as well as any position in between. The transfer element can be moved horizontally incrementally so that the general cargo can be transferred to the grouping space in a positioned manner, preferably centered, off-center or stacked with other general cargo, stacked next to each other or overlapping. This makes it possible for the transfer device to be used for both individual and synchronized transfer to the grouping space, for example for a general cargo to be transferred centrally into a transport tray of a tray conveyor. It is also possible to realize a stacked transfer while the conveyor element of the discharge conveyor continues to move, in particular continuously.

Alternatively, it is also possible to provide several general cargo items to a grouping space in a stacked manner. For example, several general cargo items can be transferred to a stack within a grouping space, several general cargo items can be transferred to several stacks within a grouping space or several general cargo items can be staggered and at least partially overlapped.

A particularly space-saving design can be achieved if the transfer element is arranged below the feeder and can be moved horizontally with respect to a distal end of the feeder. The transfer element, for example in the form of a plate or a telescopic conveyor belt as explained in more detail above, as well as the drive of the transfer element can be arranged below the conveyor, which enables a particularly compact transfer device that is particularly short horizontally.

In the receiving position, the transfer element can be arranged protruding with respect to a distal end of the conveyor in order to at least partially close a transfer section. This transfer section can be designed as a window or as a physically shaped shaft, for example in the form of a funnel. In the delivery position, the transfer element can be retracted below the feeder to release the transfer section. The transfer section can be limited by the distal end of the feeder and by a stop arranged at a distance from it. The stop thus limits the transfer section and ensures that a piece of general cargo to be transferred through the transfer section to the grouping space also comes to rest on the grouping space.

The grouping space is typically arranged on the delivery conveyor, so that a commissioning group formed thereon can be conveyed away by means of the delivery conveyor. In the present disclosure, commissioning group is understood to mean both an ordered and an unordered accumulation of general cargo. Thus, one or more stacks as well as a pile or an overlapping arrangement of general cargo placed sequentially on top of one another can be understood as a commissioning group. Depending on the downstream system, the delivery conveyor can be designed as a belt, roller or tray conveyor. The grouping space can take the form of a virtual grouping space or a physical frame arranged on the delivery conveyor. Alternatively, the grouping space can also be arranged within a receiving container that is arranged on the delivery conveyor. The container can be a box, carton, tray or tub. Alternatively, a frame, for example a U-shaped frame, can also be used.

In order to achieve the most efficient possible packaging, by keeping the number of work steps to a minimum and at the same time achieving the smallest possible parcels, which saves volume and thus shipping costs, the parcels can be formed directly around the commissioning group. The commissioning group is delivered onto a flat cardboard, which is cut to size after measuring the commissioning group, folded around the commissioning group and then glued. In order to avoid a repeated transfer, the commissioning group can be formed directly on a plate-shaped piece of cardboard, which is provided on the delivery conveyor.

Foils, bags or preferably rectangular or square flat cardboard webs can be provided as the starting material for the packaging. Alternatively, an continuous sheet of cardboard can also be provided on the delivery conveyor. Packaging in the form of a shipping bag, a film wrap or a cardboard box can be formed around the commissioning group. The commissioning groups can be transferred to the continuous sheet of cardboard by means of the transfer element. Packaging can then be formed around the commissioning group assembled at the grouping space by means of the transfer element, preferably in the form of a carton that is folded around the commissioning group. This does not simply mean packing in a carton, but forming a carton in the form of a package. Based on the recorded dimensions, length, width and height, a package can be formed by machine cutting, folding and gluing the flat starting material. During shipping, additional inserts can be added to the commissioning group in a further step before the package is formed. For example, in the form of delivery bills, invoices, brochures or advertising material. Important information for shipping can be attached to the packaging, for example in the form of shipping labels.

A sensor unit can be arranged at the distal end of the feeding conveyor, by means of which the arrival of a general cargo conveyed by the feeding conveyor can be detected and, based on a first sensor signal measured by the sensor unit and sent to a control unit, the transfer element can be moved from the delivery position to the receiving position by means of the control unit in order to receive the general cargo conveyed and detected by the sensor. The receiving position can also be movable so that the transfer element can be moved together with the feeding conveyor in order to improve the transfer to the transfer element. This can be particularly relevant for loosely packed general cargo, such as clothing.

The sensor unit can ensure synchronized transfer by allowing the control unit to control either the travel path of the transfer element and/or the acceleration of the transfer element based on the sensor signal. If, for example, a centered transfer to a passing grouping space is desired, the control unit can adjust the transfer element based on the first sensor signal so that the centered transfer is ensured.

In addition for detecting the arrival of the respective general cargo by means of the sensor unit, the control unit can also be used to monitor the general cargo passing by, by being conveyed by the conveyor. When leaving the sensor area of the sensor unit, a second sensor signal can be sent from the sensor unit to the control unit and, based on the second sensor signal, the transfer element can be moved by the control unit from the receiving position back to the delivery position in order to transfer the picked-up general cargo to the grouping space by gravity.

The transfer device can define a transfer section, wherein the transfer element at least partially closes the transfer section and a general cargo picked up by the transfer element. By means of the movement starting from the delivery position, the transfer element can release the transfer section at least in such a way that a general cargo picked up thereon can be transferred gravity-driven through the transfer section to the grouping space. The transfer device can comprise a detection device by means of which the layout of the commissioning group can be monitored in a top view and/or the outline or the height of the commissioning group can be monitored in a side view.

Preferably, the transfer section is monitored by means of this detection device. For limiting the transfer section, the transfer device can comprise a stop for positioning the general cargo, whereby the transfer section is typically limited by the stop and the distal end of the conveyor, through which the general cargo can be transferred to the grouping space by gravity.

The order picking system can be part of a logistics system. In addition to the order picking system, the logistics system typically also includes a storage device and/or a sorting device and/or a depot. Typically, the general cargo is delivered to the input side of the logistics system, for example by means of a truck. After unloading, the general cargo is typically transported through the following areas of the logistics system: Delivery, goods receipt, storage, packaging and labeling, buffering, storage, sorting, distribution, packaging, removal, which is also typically carried out again by truck.

To transport the goods from feeding stations through the logistics system, they can be transported by means of suspension conveyor receiving means. To fill the suspension conveyor receiving means, the logistics system can have a device for filling the suspension conveyor receiving means. When unfilled, the suspension conveyor receiving means are already arranged in a waiting position on the suspension conveyor by means of carriages. The carriages are movably mounted on a running rail in the direction of the running rail and the suspension conveyor receiving means are each suspended downwards on the carriage for the purpose of retaining general cargo.

During transportation in the filling device, the suspension conveyor receiving means can be transported suspended on a piece of running rail which corresponds to a section of the running rail and which can optionally be connected to one end of the first running rail or the second running rail. In the filling device, the suspension conveyor receiving means are typically rotated for filling. For this purpose, an active arrangement is advantageously provided with which the transport elements can be rotated by a certain angle of rotation at a certain point on the conveyor path, whereby a suspension hook on the suspension of the suspension conveyor receiving means can typically be transferred from the first position to a second position or from the second position to the first position. The suspension conveyor receiving means are advantageously repositioned by rotating the suspension conveyor receiving means themselves, advantageously about a central axis. A brush arrangement or mechanical, electrical, magnetic or pneumatic actuating means are particularly advantageous as an active arrangement.

In an alternative filling device, the suspension conveyor receiving means are separated in a transfer area by means of a separating mechanism, for example by means of a screw conveyor. The general cargo to be fed is conveyed by means of a feeding device, which typically comprises several conveyor units arranged one behind the other, each with a conveyor belt. In the transfer area, the feed conveyor can have a final conveyor unit in the form of a roller conveyor, over which the general cargo can unroll and slide or slide from above into the suspension conveyor receiving means.

During filling, an individual suspension conveyor receiving means is moved along a feeding conveyor section in the conveying direction with the receiving compartment leading in the conveying direction into the transfer area. The suspension conveyor receiving means is actively opened before or in the transfer area by means of an opening mechanism. In the transfer area, the suspension conveyor receiving means typically rests with a first side against the final conveyor unit of the feed conveyor, which consequently forms a support. As soon as the suspension conveyor receiving means has reached the transfer area, the conveying of the suspension conveyor receiving means is stopped for the purpose of transferring a general cargo item. Consequently, the suspension conveyor receiving means is not in a conveying movement when the general cargo is being transferred in the suspension conveyor receiving means.

General cargo resting on the conveying surface of the conveyor units is conveyed to the transfer area via the infeed conveyor. The general cargo slides over the roller conveyor of the final conveyor unit in a transfer direction through the receiving opening into the suspension conveyor receiving means. After the general cargo has been transferred into the suspension conveyor receiving means, it is moved out of the transfer area with the general cargo by means of the entraining conveyor from the horizontal conveyor. During this process, the suspension conveyor receiving means rolls with one side on the roller conveyor of the final conveyor unit.

The final conveyor unit with the roller conveyor can be swivelled away from its conveying position to clear the conveying path for the suspension conveyor receiving means loaded with the general cargo. As soon as the suspension conveyor receiving means loaded with the general cargo is conveyed upwards out of the transfer area, a subsequent suspension conveyor receiving means can be conveyed into the transfer area.

A batch buffer can also be provided for storing and sorting the general cargo within the logistics system in order to provide groups of goods. These product groups can be provided in the form of batches. The logistics system can also include one or more matrix sorters for sorting the goods in batches. A plurality of suspension conveyor receiving means, each comprising a receiving unit, preferably in the form of a suspension conveyor receiving means, can be fed to a matrix sorter for sorting the goods. A matrix sorter can also have several sorting stages.

If the matrix sorter is arranged downstream of the batch buffer and/or the filling device within the logistics system, it can take over the already filled suspension conveyor receiving means from the batch buffer and/or from the filling device. The matrix sorter typically comprises at least one circulating conveyor for conveying the suspension conveyor receiving means, as well as outgoing stitches for sorting the suspension conveyor receiving means, whereby the logistics system comprises a control system which is designed to control the conveying speed of the circulating conveyor.

The batch buffer can also have stitches that are branched off from another conveyor, preferably a recirculating conveyor. The circulating conveyor is usually designed to convey the suspension conveyor receiving means at a constant conveying speed. The control system can be designed to control the conveying speed of the recirculating conveyor in such a way that the conveying speed of the recirculating conveyor is higher than the constant conveying speed of the other conveyors in at least one batch.

The circulating conveyor is typically designed to feed the suspension conveyor receiving means to and/or from a sorting stage. A sorting stage of the matrix sorter can have a number of linear buffer sections, which are connected to the circulating conveyor by switches. The buffer sections are preferably designed as stitches and can be designed as gravity sections with a gradient such that the suspension conveyor receiving means can be conveyed in the gravity sections by gravity. The batch buffer can also have a plurality of stitches in the form of linear storage sections, into each of which one or more batches can preferably be stored.

At least one measuring device can be arranged upstream of the matrix sorter, which is designed to determine the parameters, preferably the weight and/or size, of the suspension conveyor receiving means and/or goods entering the matrix sorter and to transmit them to the control system.

The logistics system can have a database in which the parameters, preferably the weight and/or size, of the suspension conveyor receiving means and/or goods entering the matrix sorter are stored. The matrix sorter can comprise a number of sorting stages and a number of sorting sections, each of which is assigned to one sorting stage or two sorting stages. The control system is typically designed to control the conveying speed of each matrix conveyor individually.

In addition to the matrix sorter, the logistics system can also include a buffer. This is usually arranged before or after the batch buffer. The at least one intermediate store typically comprises a dynamic store for intermediate storage of the goods/general cargo provided for picking and a retrieval store connected downstream of the dynamic store for storing goods that have been retrieved from the dynamic store and presorted in the process. The dynamic storage unit and the retrieval storage unit can be arranged within a common circulating conveyor and can be connected to each other via the common circulating conveyor.

The recirculating conveyor is typically a conveyor with which the goods can be conveyed in a closed circuit. Actuated or switchable diverters can be provided at various points on the recirculating conveyor. The diverters enable new goods to be selectively fed into the circulation system or goods circulating in the circulation system to be removed. The goods are subdivided in the suspension conveyor receiving means, preferably in the form of suspension conveyor pouches, each of which can be moved separately and added to or removed from the circulation system.

The goods circulating and stored in the dynamic storage are available in a specific sequence, which is usually based on the staggered retrieval of the goods from the warehouse, but does not correspond to the goods compositions ("batches") determined by the orders. By presorting the goods in the call-off storage, the goods are already grouped together in a composition corresponding to the orders, so that a subsequent matrix sorter or an order picking system is relieved of sorting work and can be dimensioned accordingly smaller or completely eliminated.

The general cargo is then transferred to the order picking system according to the disclosure for packaging. A method according to the disclosure for transporting and providing general cargo comprises at least the following process steps:

providing an order picking system according to the disclosure, comprising a feeding device comprising a suspension conveyor, a delivery station and a transfer device with a horizontally movable transfer element;

feeding of the general cargo by means of the suspension conveyor and delivery of the general cargo from the suspension conveyor to the transfer device by means of the delivery station; and transferring the conveyed general cargo by means of the transfer device and grouping of the general cargo at a grouping space.

The transfer device can have a feeding conveyor adjacent to the delivery station of the feeding device and the transfer element can be moved horizontally between a receiving position for receiving a general cargo and a delivery position for delivering the general cargo.

By means of a driven alignment element of an alignment module, the general cargo can be aligned along and/or laterally with respect to a conveying direction and/or spaced from an upstream or downstream general cargo.

The transfer element can be moved horizontally with respect to a distal end of the feeding conveyor for grouping at the same time as the feeding conveyor in order to take over a piece of general cargo from the feeding conveyor.

The transfer element can be moved back with respect to the distal end of the conveyor to group the general cargo already on the transfer element, so that the general cargo is transferred gravity-driven through the transfer section to the grouping space.

The transfer element is preferably accelerated, particularly preferably retracted abruptly, so that the general cargo picked up on it is essentially motionless due to its inertia in the horizontal plane and then falls down onto the grouping space driven by gravity.

The transfer element for grouping the feeder is moved in such a way that:
- the general cargo is transferred essentially centrally to the grouping space to form a commissioning group, or
- the general cargo is transferred eccentrically to the grouping space to form several commissioning groups, or
- the transfer element is moved on incrementally so that a subsequent general cargo is transferred to the grouping space overlapping a previous general cargo.

BRIEF DESCRIPTION OF THE DRAWINGS

Aspects of the disclosure are explained in more detail with reference to the embodiments shown in the following figures and the associated description. The figures show.

DESCRIPTION OF THE EMBODIMENTS

Figure 1:
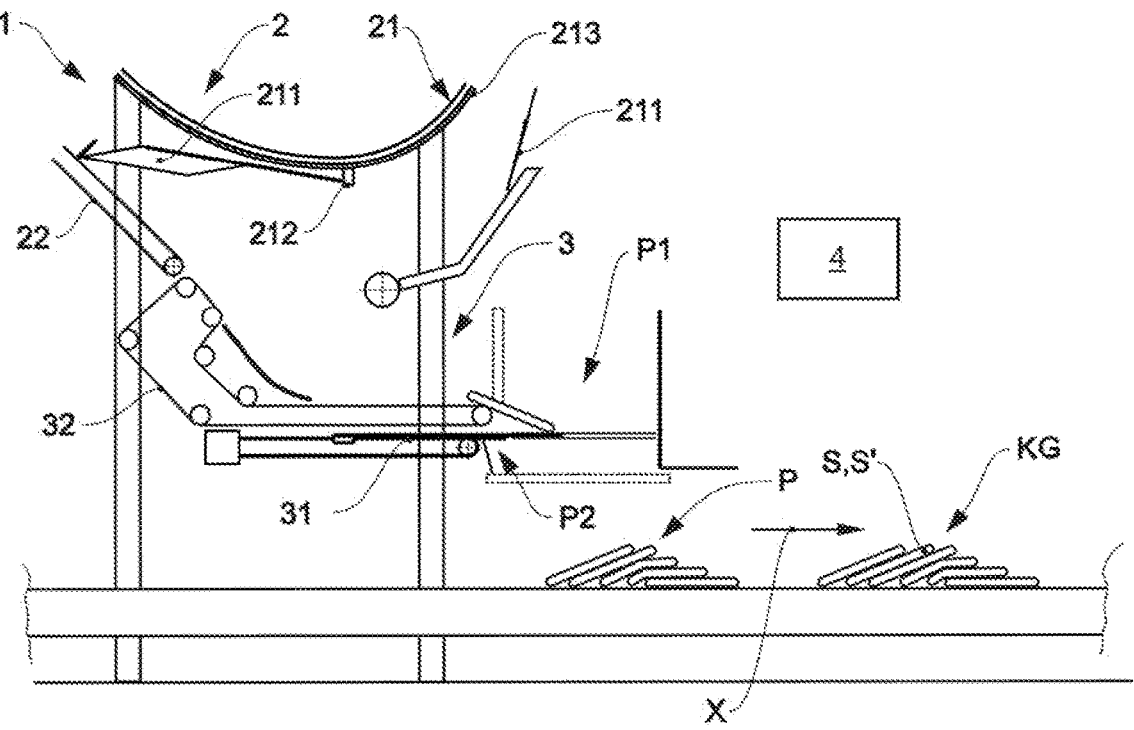
FIG. 1 shows a first example of the order picking system forming commissioning groups.

FIG. 1 shows a first embodiment of the order picking system 1 when forming commissioning groups KG. The illustrated order picking system 1 for transporting and providing general cargo S, S' comprises a feeding device 2, which comprises a suspension conveyor 21 for feeding the general cargo S, S'. The illustrated suspension conveyor 21 comprises suspension conveyor receiving means 211 in the form of suspension conveyor pouches, by means of which the general cargo S, S' can be conveyed in a suspended state. The suspension conveyor pouches 211 are guided on a rail 213 of the suspension conveyor 21 by means of carriages 212. To empty the suspension conveyor pouches 211, they are pivoted as shown.

Adjacent to the suspension conveyor 21, the illustrated feeding device 2 comprises a delivery station 22 for delivering the general cargo S, S' from the suspension conveyor 2.1 to a transfer device 3. For grouping the general cargo S, S' conveyed, the transfer device 3 comprises a horizontally movable transfer element 31, by means of which the general cargo S, S' can be grouped on a grouping space P by gravity. The transfer device 3 is arranged adjacent to the delivery station 22 of the feeding device 2 and comprises a feeding conveyor 32. The transfer element 31 can be horizontally movable for transferring at least between a receiving position P1 for receiving a conveyed general cargo S and at least one delivery position P2 for delivering a general cargo S located on the transfer element 31.

Figure 2:
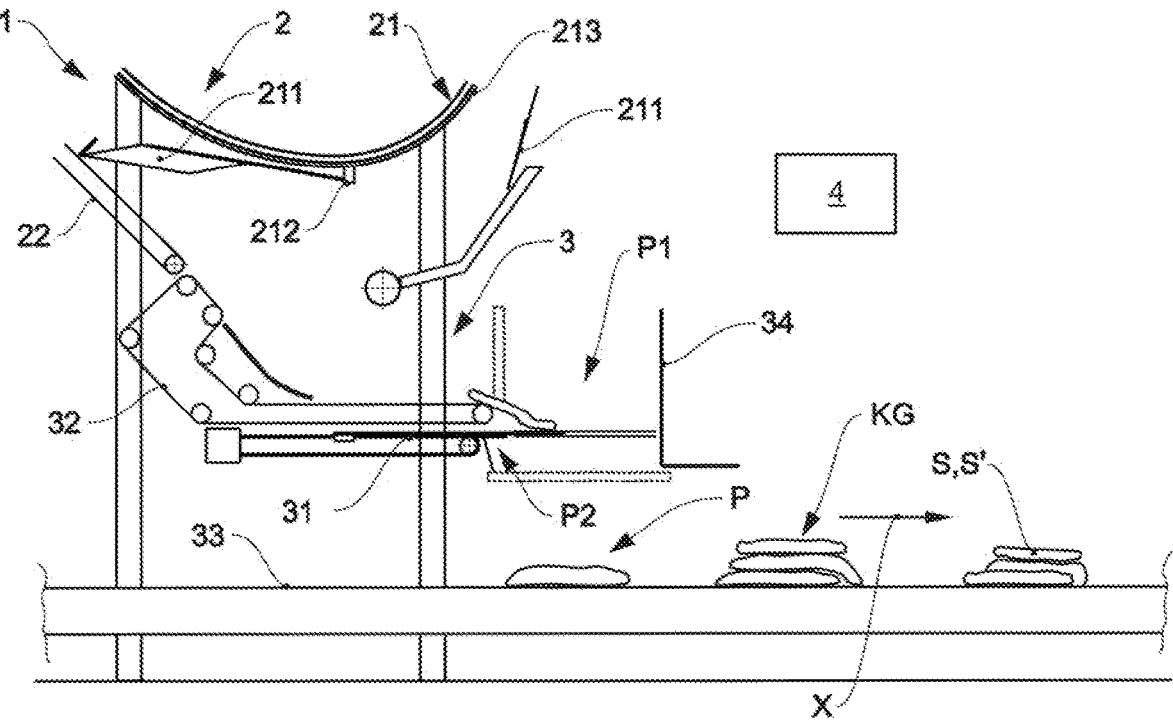
FIG. 2 shows the first embodiment of the order picking system when forming commissioning groups in the form of stacks.

In the embodiment shown, the transfer element 31 is moved horizontally incrementally further in the delivery position P2 when another general cargo S is transferred, so that the general cargo S is transferred to the grouping space P in a positioned manner. In the embodiment shown, the general cargo S, S' is transferred in an overlapping manner. FIG. 2 shows the second embodiment of the order picking system 1 when forming commissioning groups KG in the form of stacks. For this purpose, several general cargo items S, S' are transferred to the grouping space P one after the other, essentially in the middle. The general cargo S, S' are all positioned on top of each other for this purpose.

Figure 3:
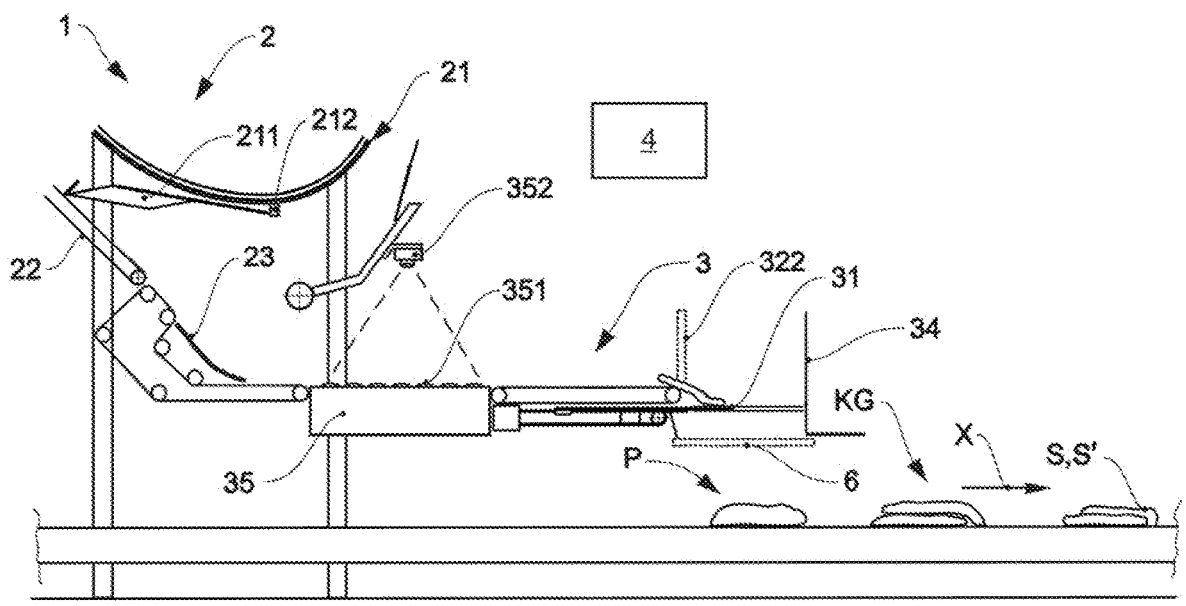
FIG. 3 shows a second embodiment of the order picking system with an alignment module when forming commissioning groups.

FIG. 3 shows a second embodiment of the order picking system 1 with an alignment module 35 when forming commissioning groups KG. The embodiment of the order picking system 1 shown also comprises a feeding device 2 comprising a suspension conveyor 21 for feeding the general cargo S, S' and a delivery station 22 for delivering the general cargo S, S' from the suspension conveyor 21 to a transfer device 3 for grouping the general cargo S, S' which comprises a horizontally movable transfer element 31 by means of which the general cargo S, S' can be grouped on a grouping space P by gravity.

Figure 4:
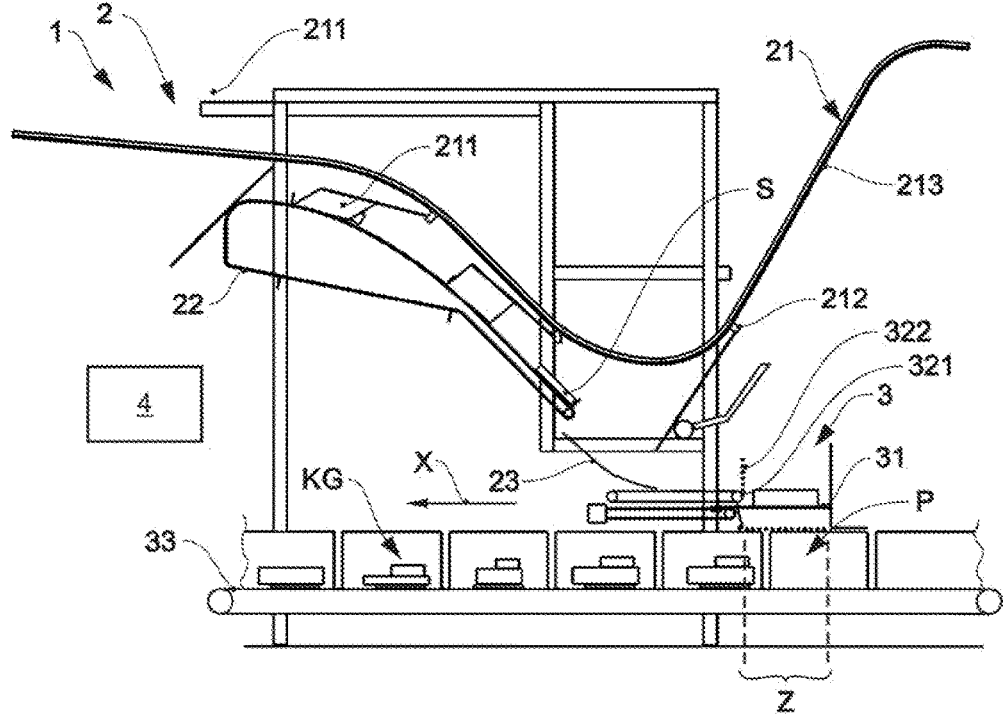
FIG. 4 shows a third embodiment of the order picking system when transferring a first piece of general cargo to a grouping space.
Figures 5, 6:
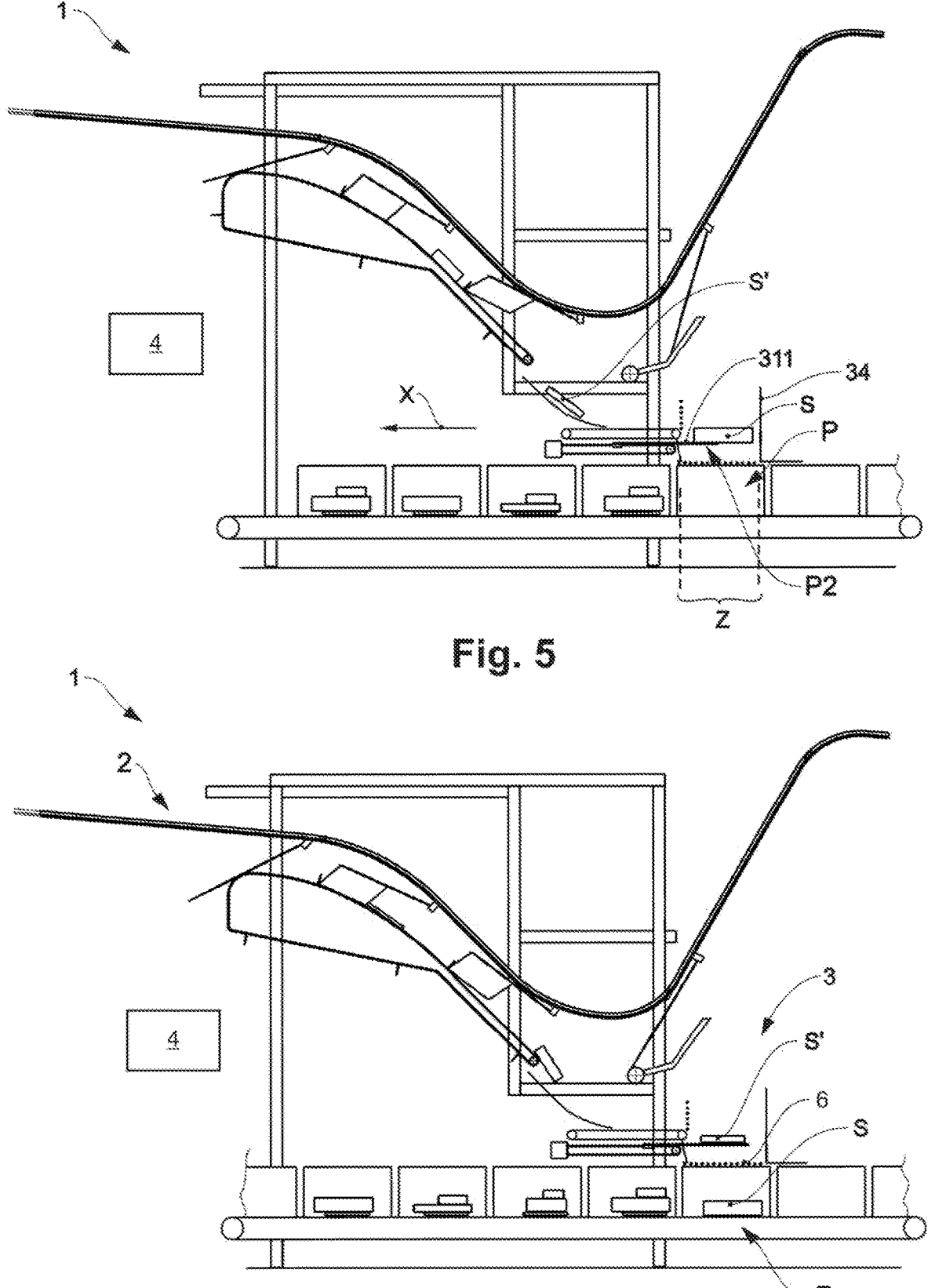
FIG. 5 shows the third embodiment of the order picking system during the transfer of the first general cargo and simultaneous delivery of a further general cargo.
FIG. 6 shows the third embodiment of the order picking system when transferring the further general cargo to the first general cargo to form a stack.

FIGS. 4 to 6 show a third embodiment of the order picking system 1. The embodiment of the order picking system 1 shown also comprises a feeding device 2, comprising a suspension conveyor 21 for feeding the general cargo S, S' and a delivery station 22 for delivering the general cargo S, S' from the suspension conveyor 2.1 to a transfer device 3 for grouping the conveyed general cargo S, S', which transfer device 3 comprises a horizontally movable transfer element 31, by means of which the general cargo S, S' can be grouped at a grouping space P by gravity. A slide 23 is provided in this embodiment example for transferring the general cargo S, S' from the delivery station 22 to the feeding conveyor 32.

The illustrated transfer element 31 is arranged below the feeder 32 and is horizontally movable with respect to a distal end 321 of the feeder 32. In the receiving position P1 shown, the transfer element 31 is arranged protruding with respect to the distal end 321 in order to at least partially close the transfer section Z. A sensor unit 322 is arranged at the distal end 321 of the feeding conveyor 32, by means of which the arrival of one of the general cargo S conveyed by the feeding conveyor 32 can be detected and, based on a first sensor signal measured by the sensor unit 322 and sent to a control unit 4, the transfer element 31 can be moved from the delivery position P2 into the receiving position P1 by means of the control unit 4 in order to receive the general cargo S conveyed and detected by the sensor unit 322.

FIG. 5 shows the third embodiment of the order picking system 1 during transfer of the first general cargo S and simultaneous delivery of a further general cargo S'. In the delivery position P2 shown, the transfer element 31 releases the transfer section Z in such a way that the general cargo S picked up on the transfer element 31 is transferred through the transfer section Z to the grouping space P by gravity.

FIG. 6 shows the third embodiment of the order picking system 1 when the further general cargo S' is transferred to the first general cargo S to form a stack. As shown, several general cargo items S, S' are transferred to the grouping space P one after the other, essentially in the center. The general cargo S, S' are positioned one above the other and placed on top of each other.

FIG. 7 shows an embodiment of the alignment module 35. The illustrated alignment module 35 comprises driven alignment elements 351, by means of which the general cargo S can be aligned along and/or laterally with respect to a conveying direction X. The general cargo S, S' conveyed via the slide 23 of the feeding device 2 does not arrive aligned. The alignment module 35 arranged upstream of the feeding conveyor 32 in the embodiment example shown comprises alignment elements 351 in the form of rollers, wheels or balls. Compared to rollers or wheels, balls offer greater mobility and flexibility in a conveyor system application. The alignment elements 351 are driven individually and independently of one another in order to align the general cargo S, S' along the conveying direction X and/or laterally thereto during conveying on the alignment module 35.

Figures 7A, 7B, 7C, 7D:
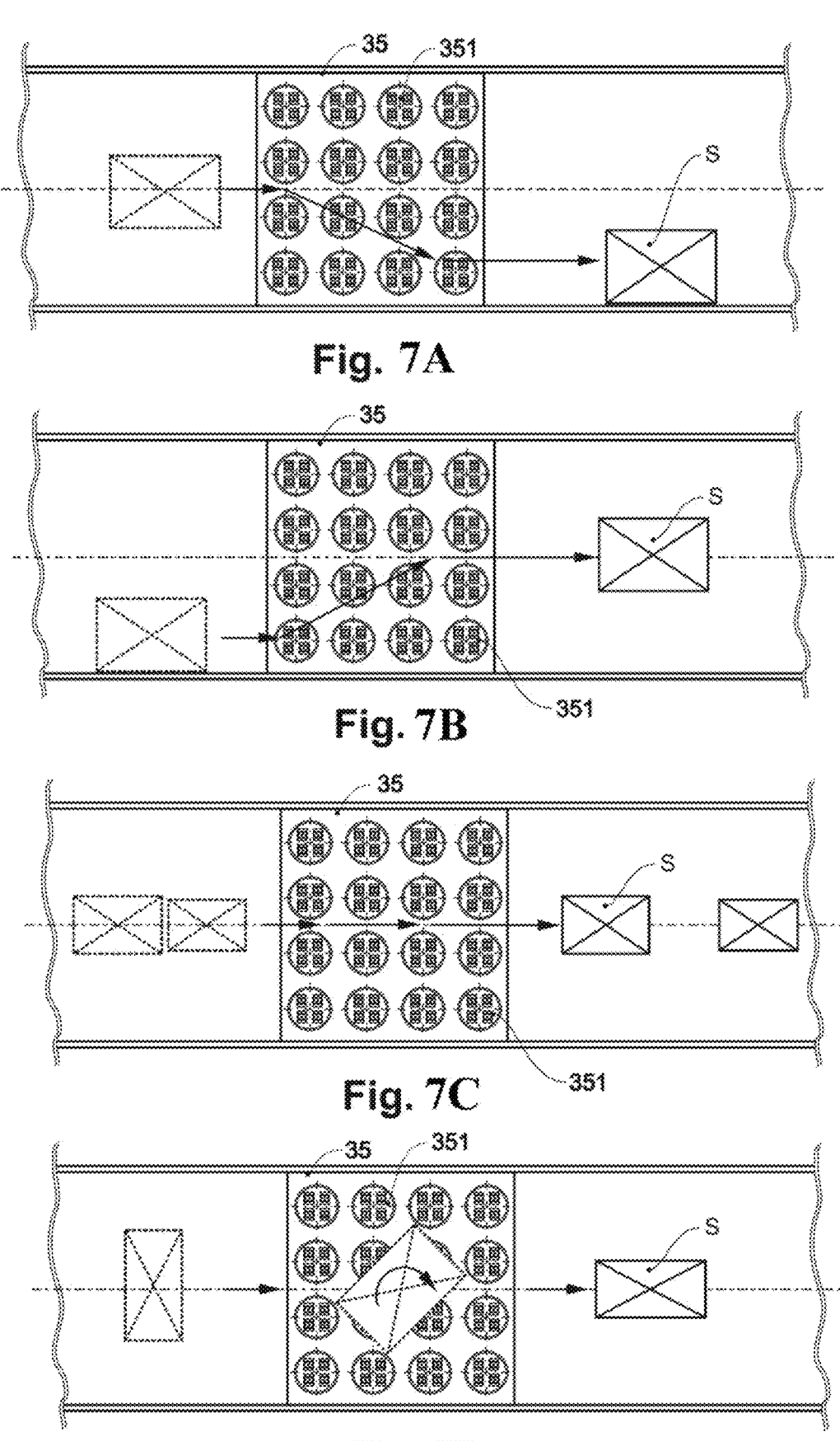
FIG. 7A shows an embodiment of the alignment module aligning the general cargo.
FIG. 7B shows another embodiment of the alignment module aligning the general cargo.
FIG. 7C shows an embodiment of the alignment module spacing the general cargo.
FIG. 7D shows an embodiment of the alignment module turning the general cargo.

FIGS. 7a and 7b show an alignment of general cargo S, S' with respect to the conveying direction X. FIG. 7c shows a spacing of general cargo S, S' from one another along the conveying direction X and FIG. 7d shows a rotation of general cargo S. In order to convert an alignment of a conveyed general cargo S into a target alignment, a sensor unit 352 is arranged above the alignment module 35, by means of which an alignment of the general cargo S on the alignment module 35 can be detected. Based on a sensor signal measured by the sensor unit 352 and sent to a control unit 4, the general cargo S is aligned on the alignment module 35 by means of the control unit 4 by actively and directionally driving the alignment elements 351 and can also be spaced apart from an upstream or downstream general cargo S'. The general cargo S is then transferred as shown, aligned and spaced apart, to the feeding conveyor 32 and transferred by the latter to the transfer element 31.

Figure 8:
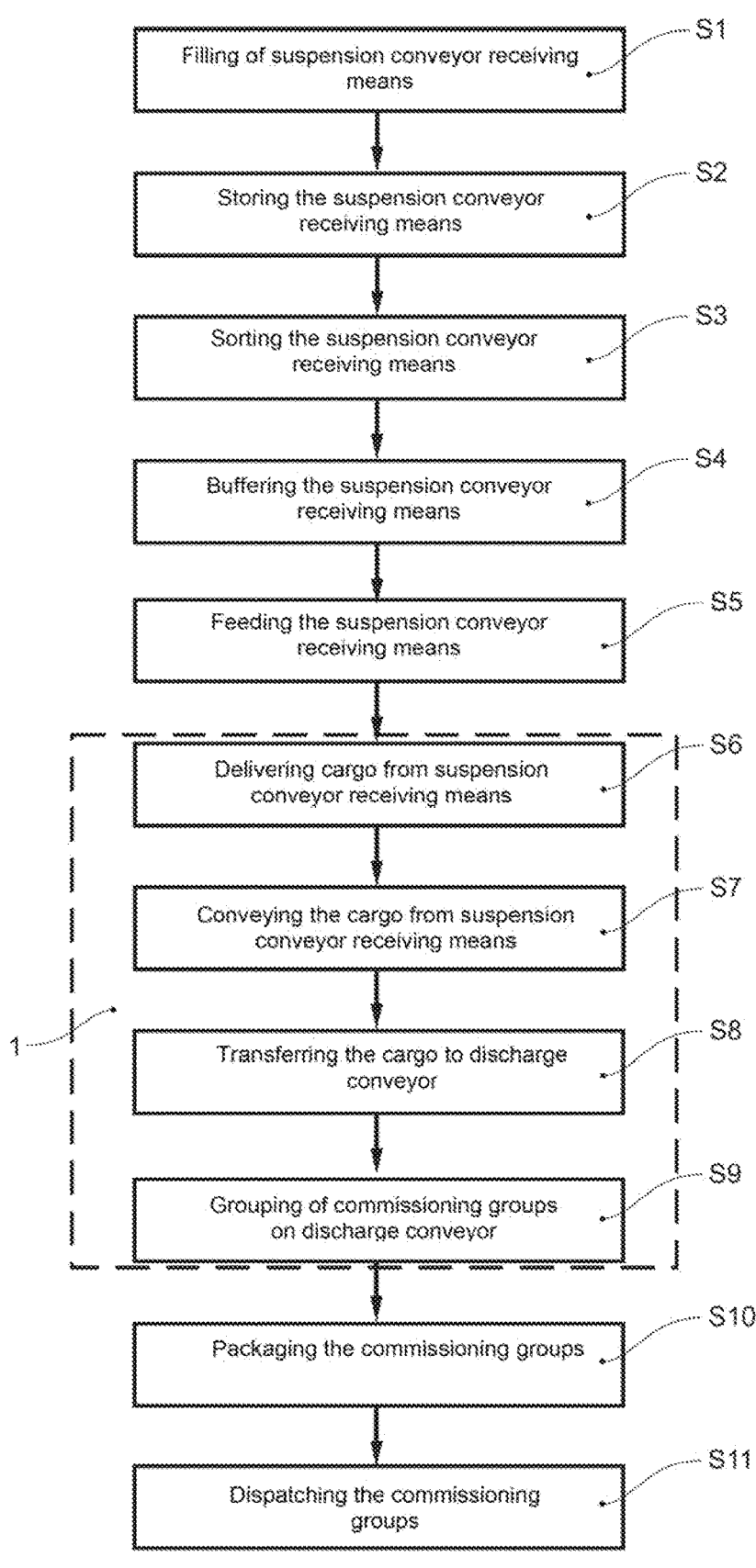
FIG. 8 shows a flowchart of a logistics system which includes an order picking system.

FIG. 8 shows a flow diagram of a logistics system comprising an example of the order picking system. In addition to the order picking system, the logistics system also comprises a storage device and a sorting device, as well as a storage device. The general cargo is delivered to the input side of the logistics system, for example by means of a truck.

To transport the goods from feeding stations through the logistics system, they can be transported by means of suspension conveyor receiving means. To fill the suspension conveyor receiving means, the logistics system can have a device for filling (S1) the suspension conveyor receiving means. In the unfilled state, the suspension conveyor receiving means are already arranged on the suspension conveyor by means of carriages and kept ready in a waiting position. The carriages are movably mounted on a running rail in the direction of the running rail and the suspension conveyor receiving means are each suspended downwards for the purpose of retaining cargo.

During transportation in the filling device, the suspension conveyor receiving means can be transported suspended from a piece of running rail which corresponds to a section of the running rail and which can optionally be connected to one end of the first running rail or the second running rail. In the filling device, the suspension conveyor receiving means are typically rotated or pivoted for filling. For this purpose, an active arrangement is advantageously provided with which the transport elements can be rotated at a certain point on the conveyor path by a certain angle of rotation relative to the vertical central axis of the suspension conveyor receiving means, whereby a suspension hook on the suspension of the suspension conveyor receiving means can typically be transferred from the first position to a second position or from the second position to the first position. Alternatively, pivoted suspension conveyor receiving means can be filled by means of a feed device.

A batch buffer can also be provided for storing (S2) the general cargo within the logistics system to provide groups of goods. The logistics system can also include one or more matrix sorters for sorting (S3) the goods in batches. A plurality of suspension conveyor receiving means, each comprising a receiving unit, preferably in the form of a suspension conveyor receiving means, can be provided to retain the goods in the matrix sorter. A matrix sorter can also have several sorting stages.

If the matrix sorter is arranged downstream of the batch buffer and/or the filling device within the logistics system, it can take over the already filled suspension conveyor receiving means of the batch buffer and/or the filling device. The matrix sorter typically comprises at least one circulating conveyor for conveying the suspension conveyor receiving means, the logistics system having a control system which is designed to dynamically control the conveying speed of the circulating conveyor in such a way that the conveying speed depends on at least one parameter, for example size and/or weight, of the conveyed suspension conveyor receiving means and/or goods.

After sorting, the suspension conveyor receiving means are typically buffered (S4). In addition to the matrix conveyor, the batch buffer can have further conveyors, preferably further recirculating conveyors, which are designed to convey the suspension conveyor receiving means at a constant conveying speed. The control system can be designed to control the conveying speed of the matrix conveyor in such a way that the conveying speed of the matrix conveyor is higher than the constant conveying speed of the other conveyors in at least one batch.

The circulating conveyor is typically designed to feed the suspension conveyor receiving means to and/or from a sorting stage. A sorting stage of the matrix sorter can have a plurality of linear buffer sections in the form of switches, which are connected to the matrix conveyor by switches. The buffer sections are preferably designed as gravity sections with a gradient such that the suspension conveyor receiving means can be conveyed in the gravity sections by gravity. The stitches can be designed as a plurality of linear storage sections, into each of which preferably one or two batches can be stored.

The logistics system can also have a database in which the parameters, preferably the weight and/or size, of the suspension conveyor receiving means and/or goods entering the matrix sorter are stored. The matrix sorter can comprise a plurality of sorting stages and a plurality of matrix conveyors, each of which is assigned to one sorting stage or two sorting stages. The control system is typically designed to control the conveying speed of each circulating conveyor individually.

In addition to the matrix sorter, the logistics system can also include a buffer. This is usually arranged before or after the batch buffer. The at least one intermediate storage unit typically comprises a dynamic storage unit for intermediate storage of the goods/general cargo provided for picking and a retrieval storage unit connected downstream of the dynamic storage unit for storing goods that have been retrieved from the dynamic storage unit and presorted in the process. The dynamic storage and the retrieval storage can be arranged within a common circulating conveyor or be connected to each other via the common circulating conveyor.

The recirculating conveyor is typically a conveyor with which the goods can be conveyed in a closed circuit. Actuated or switchable diverters can be provided at various points on the recirculating conveyor. The diverters enable new goods to be selectively fed into the circulation system or goods circulating in the circulation system to be removed. The goods are divided in the suspension conveyor receiving means, preferably in the form of suspension conveyor pouches, each of which can be moved separately and added to or removed from the circulation system.

The goods circulating and stored in the dynamic storage are available in a specific sequence, which is usually based on the staggered retrieval of the goods from the warehouse, but does not correspond to the goods compositions ("batches") determined by the orders. By presorting the goods in the call-off buffer, the goods are already grouped together in a composition corresponding to the orders, so that a subsequent matrix sorter or an order picking system is relieved of sorting work and can be dimensioned accordingly smaller or completely eliminated.

The presorted consignments of goods prepared for dispatch are then conveyed to the order picking system (S7), in which the general cargo is transferred from the suspension conveyor receiving means (S8) and, after forming commissioning groups (S9) on the discharge conveyor, is fed to the packaging (S10) and dispatch (S11). Steps S7-S9 are carried out by means of an order picking system as shown in FIGS. 1 to 6.

Rectangular or square flat cardboard webs are usually provided as the starting material for the packaging (S10). Alternatively, an endless belt of cardboard can also be provided on the delivery conveyor. The commissioning groups can be transferred to the cardboard web by means of the transfer element. Packaging can be formed around the commissioning group assembled at the grouping space by means of the transfer element, preferably in the form of a cardboard box that is folded around the commissioning group. This does not simply mean packing in a carton, but forming a carton in the form of a package. Based on the recorded dimensions, length, width and height, a package can be formed by machine cutting, folding and gluing the flat starting material. The commissioning groups packed in this way are then dispatched (S11).

We claim:

1. An order picking system (1) for transporting and providing general cargo (S, S'), the order picking system (1) comprising:
   a. a feeding device (2) comprising a suspension conveyor (21) for feeding the general cargo (S, S') and a delivery station (22) for delivering the general cargo (S, S') from the suspension conveyor (2.1) to
   b. a transfer device (3) for grouping the conveyed general cargo (S, S'), which transfer device (3) comprises a transfer element (31) configured to move horizontally by which the general cargo (S, S') is grouped onto a grouping space (P) by gravity.

2. The order picking system (1) according to claim 1, wherein the transfer device (3) comprises a feeding conveyor (32) adjacent to the delivery station (22) of the feeding device (2) and the transfer element (31) configured to move at least between a receiving position (P1) for receiving general cargo (S) which is fed and at least one delivery position (P2) for delivering general cargo (S) which is located on the transfer element (31).

3. The order picking system (1) according to claim 2, wherein the feeding conveyor (32) is configured to accelerate or decelerate such that the respective general cargo (S) conveyed by the feeding device (2) is already transferred to the transfer element (31) in the receiving position (P1) in a clock-synchronized manner, such that it is also transferred from the transfer element (31) to a downstream delivery conveyor (33) in the delivery position (P2) in a clock-synchronized manner.

4. The order picking system (1) according to claim 2, wherein the transfer element (31) is configured to move horizontally in an incremental manner, such that the general cargo (S) is transferred to the grouping space (P) in at least one out of the following, a positioned manner, centrally, eccentrically or in dependence on further general cargo (S') and stacked or overlapping.

5. The order picking system (1) according to claim 1, wherein the transfer device (3) comprises an alignment module (35), which comprises driven alignment elements (351), which are configured to align the general cargo (S) along and/or laterally with respect to a conveying direction (X).

6. The order picking system (1) according to claim 5, wherein a sensor unit (352) is arranged above the alignment module (35), which sensor unit is configured to detect an alignment of the general cargo (S) on the alignment module (35) and based on a sensor signal, measured by the sensor unit (352) and sent to a control unit (4), the control unit (4) is configured to align and/or space the general cargo (S) from an upstream or downstream arranged general cargo (S) by actively and directionally driving the alignment elements (351) on the alignment module (35).

7. The order picking system (1) according to claim 2, wherein a sensor unit (322) is arranged at the distal end (321) of the feeding conveyor (32), which sensor unit (322) is configured to detect the arrival of a general cargo (S) conveyed by the feeding conveyor (32) and based on a first sensor signal measured by the sensor unit (322) and sent to the control unit (4), the control unit (4) is configured to move the transfer element (31) in order to pick up the general cargo (S) conveyed by the feeding conveyor (32) and detected by the sensor unit (322).

8. The order picking system (1) according to claim 7, wherein the control unit (4) is configured to monitor the transport of the general cargo (S) conveyed by the conveyor (32), wherein a second sensor signal is sent to the control unit (4) when the general cargo (S) leaves the sensor range of the sensor unit (322) and the control unit (4) is configured, based on the second sensor signal, to move the transfer element (31) from the receiving position (P1) back into the delivery position (P2) in order to transfer the received general cargo (S) to the grouping space (P) by gravity.

9. The order picking system (1) according to claim 1, wherein the transfer element (31) is configured to move in an accelerated manner in such a way that the general cargo (S) received thereon is transferred to the grouping space (P) in an essentially motionless, gravity-driven manner due to its inertia in the horizontal position.

10. The order picking system (1) according to claim 1, wherein the grouping space (S) is arranged on the delivery conveyor (33), such that a commissioning group (KG) grouped thereon is deliverable by the delivery conveyor (33), wherein the grouping space (P) is designed in the form of a virtual grouping space (V) or as a physical frame (R) arranged on the delivery conveyor (33) or within a receiving container (A) arranged on the delivery conveyor (33).

11. The order picking system (1) according to claim 1, wherein the transfer element (31) is arranged below the feeder (32) and is configured to move horizontally with respect to a distal end (321) of the feeder (32), wherein in the receiving position (P1) it is arranged protruding with respect to the distal end (321) in order to at least partially close the transfer section (Z) and in the delivery position (P2) it is retracted under the feeder (32) in such a way as to release the transfer section (Z).

12. The order picking system (1) according to claim 1, wherein the horizontally movable transfer element (31) of the transfer device (3) is designed as a plate (311), which is optionally movably mounted in lateral guides (312) or is designed as a rotatable plate.

13. The order picking system (1) according to claim 1, wherein the horizontally movable transfer element (31) of the transfer device (3) is designed as a belt conveyor (313) which is at least one of a movable belt section (314) and a telescopic conveyor belt.

14. The order picking system (1) according to claim 1, wherein the transfer device (3) comprises a stop (34) for positioning the general cargo (S, S'), wherein the transfer section (Z) is delimited by the stop (34) and the distal end (321) of the conveyor (32), through which the general cargo (S) can be transferred gravity-driven to the grouping space (P).

15. The order picking system (1) according to claim 1, wherein the transfer device (3) comprises a detection device (6) configured to determine the layout (G) of the commissioning group (KG) in a top view and/or the outline (U) or the height (H) of the commissioning group (KG) in a side view for controlling the order picking system (1).

16. The order picking system (1) according to claim 1, wherein the suspension conveyor (21) comprises suspension conveyor receiving means (211) in the form of pouches, baskets, bags or carrying loops by which the general cargo (S, S') is conveyable in a suspended manner and the suspension conveyor receiving means (211) in the form of pouches, baskets, bags or carrying loops are configured to be emptied for discharging the general cargo (S, S') from the suspension conveyor (21).

17. A method for transporting and providing general cargo (S, S') comprising the following method steps:
  a. providing (S0) an order picking system (1) according to claim 1, comprising a feeding device (2), which comprises a suspension conveyor (21), a delivery station (22), as well as a transfer device (3) with a horizontally movable transfer element (31);
  b. feeding (S5) the general cargo (S, S') by the suspension conveyor (21) and delivery (S6) of the general cargo (S, S') from the suspension conveyor (21) to the transfer device (3) by the delivery station (22);
  c. transferring (S8) the conveyed general cargo (S, S') by the transfer device (3) and grouping (S9) the transferred general cargo (S, S') at a grouping space (P).

18. The method according to claim 17, wherein the transfer device (3) comprises a feeding conveyor (32) adjacent to the delivery station (22) of the feeding device (2) and the transfer element (31) is configured to be moved horizontally between a receiving position (P1) for receiving a general cargo (S) and a delivery position (P2) for delivering the general cargo (S) for grouping (S9) the general cargo (S).

19. The method according to claim 17, wherein by driven alignment elements (351) of an alignment module (35), the general cargo (S) is aligned along and/or laterally with respect to a conveying direction (X) and/or is spaced apart from an upstream or downstream arranged general cargo (S).

20. The method according to claim 17, wherein the transfer element (31) for assembling (S9) is moved horizontally with respect to a distal end (321) of the feeding conveyor (32) simultaneously with the feeding (S2) in order to take over general cargo (S) fed by the feeding conveyor (32) from the feeding conveyor (32).

21. The method according to claim 17, wherein the transfer element (31) for grouping (S9) the general cargo (S) already on the transfer element (31) is moved back simultaneously with respect to the distal end (321) of the conveyor (32), so that the general cargo (S) is transferred gravity-driven through the transfer section (Z) to the grouping space (P).

22. The method according to claim 21, wherein the transfer element (31) is returned in an accelerated manner, so that the general cargo (S) picked up thereon falls down onto the grouping space (P) essentially motionless due to its inertia in the horizontal, subsequently driven by gravity.

23. The method according to claim 17, wherein the transfer element (31) is moved for assembling so that:
  a. the general cargo (S) is transferred essentially centrally to the grouping space (P) to form a commissioning group (KG), or
  b. the general cargo (S) is transferred eccentrically to the grouping space (P) to form several commissioning groups (KG) at the grouping space (ST), or
  c. the transfer element (31) is moved on incrementally so that a subsequent general cargo (S) is transferred to the grouping space (P) overlapping a preceding general cargo (S).

24. The method according to claim 17, wherein a packaging is formed around the commissioning group (KG) assembled at the grouping space (P).

* * * * *